United States Patent
McKnight (10) Patent No.: US 7,237,585 B2
(45) Date of Patent: Jul. 3, 2007

(54) FLIP-DOWN CHAINSAW CUTTER

(75) Inventor: Larry Donald McKnight, 4885 St. Louis Rock Rd., Villa Ridge, MO (US) 63089

(73) Assignee: Larry Donald McKnight, Villa Ridge, MO (US)

( * ) Notice: Subject to any disclaimer, the term of this patent is extended or adjusted under 35 U.S.C. 154(b) by 0 days.

(21) Appl. No.: 11/218,869

(22) Filed: Sep. 2, 2005

(65) Prior Publication Data

US 2006/0070246 A1    Apr. 6, 2006

Related U.S. Application Data

(60) Provisional application No. 60/616,131, filed on Oct. 5, 2004.

(51) Int. Cl.
*A01G 23/08*    (2006.01)
*B27B 17/08*    (2006.01)

(52) U.S. Cl. .................. 144/34.1; 30/379; 30/381; 83/574; 83/798; 83/928

(58) Field of Classification Search .............. 30/279, 30/279.5, 381; 83/795, 574, 797, 798, 928; 56/228, 244, 245; 144/4.1, 24.13, 34.1, 336, 144/338, 343
See application file for complete search history.

(56) References Cited

U.S. PATENT DOCUMENTS

| | | | |
|---|---|---|---|
| 789,512 A | 5/1905 | Waller | |
| 846,869 A | 3/1907 | Snow | |
| 2,348,588 A * | 5/1944 | Arsneau | 144/34.1 |
| 2,423,047 A | 6/1947 | Pfingsten | |
| 2,618,350 A | 11/1952 | Von Ruden | |
| 2,668,566 A * | 2/1954 | Goodlet | 144/34.1 |
| 2,705,858 A * | 4/1955 | Marsh | 56/11.6 |
| 2,815,049 A | 12/1957 | Herscovitch | |
| 3,123,112 A | 3/1964 | Hodges et al. | |
| 3,236,036 A * | 2/1966 | Bailey et al. | 56/10.3 |
| 3,604,479 A | 9/1971 | Jordan | |
| 3,970,125 A | 7/1976 | Muirhead et al. | 144/34 R |
| 4,245,535 A | 1/1981 | Lockwood et al. | 83/798 |
| 4,320,679 A | 3/1982 | Trudeau | 83/574 |
| 4,342,243 A | 8/1982 | Porritt | 83/574 |
| 4,506,464 A * | 3/1985 | Cartner | 37/91 |
| 4,553,463 A | 11/1985 | Engel | 83/796 |
| 5,390,715 A * | 2/1995 | Luscombe | 144/24.13 |
| 5,735,323 A * | 4/1998 | Maloch | 144/34.1 |
| 6,481,324 B1 * | 11/2002 | Johnston | 83/795 |

FOREIGN PATENT DOCUMENTS

| | | | |
|---|---|---|---|
| DE | 925548 | 3/1955 | |
| GB | 2 002 683 A * | 2/1979 | 144/24.13 |
| JP | 05219817 A * | 8/1993 | 56/245 |

* cited by examiner

*Primary Examiner*—Clark F. Dexter (57) ABSTRACT

A metal frame having at least one wheel attached in a way that permits the frame to be moved from one location to another. Attached to the frame is a chain saw that can be used in more than one cutting position using remote controls attached to the metal frame and controlled by the operator. The operator controls the saw's cutting position either vertically or horizontally with a tension rope that moves the saw to the desired cutting position. The saw's throttle is controlled by a flexible cable attached to a throttle assembly at the saw and a handle attached to the right side of the metal frame allowing the operator to control the cutting speed of the chain saw from high rpm to idle speed.

4 Claims, 7 Drawing Sheets

FLIP-DOWN CHAINSAW CUTTER

This application claims priority to the provision application Ser. No. 60/616,131 filed on Oct. 5, 2004.

The flip-down chainsaw cutter is a mobile unit that holds a chainsaw and cuts in multiple positions.

BACKGROUND

Figure 7:
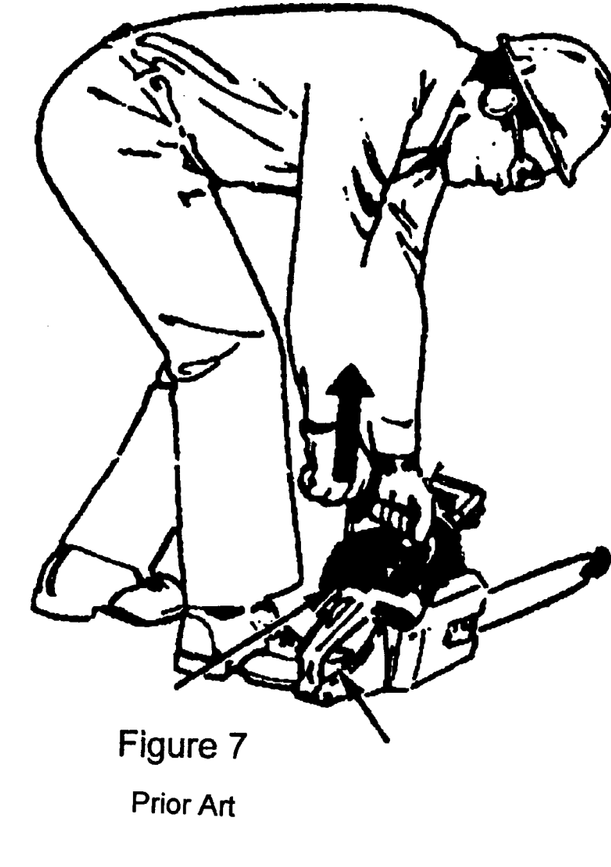
FIG. 7 shows a view of an operator with a conventional chain saw taken from a chain saw manufacture owner's manual and depicts the recommended safe starting position when starting a chain saw.

The reason for this invention is to provide an easier way to use a chainsaw for cutting down trees. A conventional chainsaw is shown in FIG. 7, and normal use of such a chainsaw when cutting trees close to ground level puts stress on the user's knees and back. This invention reduces the stress.

The present invention is a dual purpose device that cuts in a horizontal and a vertical position. With one pull of a tension rope the chainsaw changes angles for cutting in a horizontal position. Another pull of the tension rope and the chainsaw returns to the vertical position for cutting vertically. The chainsaw in the horizontal position is used to cut down trees. The chainsaw in the vertical position is used to prune, cut the felled trees into shorter lengths, and cut cord wood. It can also be modified to cut at any angle between horizontal and vertical by installing an adjustable locking bracket. The tension rope can be attached to a movable lever that when pulled would perform the same pivoting action as pulling the tension rope by its handle.

SUMMARY

The chainsaw mounts to a main frame that has a platform for the user's foot when pulling the starting rope. It meets the chainsaw manufacturers' recommended safe starting position. The unit has one wheel which provides a single pivot point when cutting making it easier to maneuver between trees on uneven terrain. It pivots 90° without lifting the wheel. The single wheel is easy to use in heavy grass, and the balloon tire gives more traction. A depth gauge is mounted on the frame providing protection for the chainsaw when cutting. The front lower frame in front of the chainsaw acts as a stop against the tree while cutting. The handle length puts the user far enough away from the cutting blade reducing the chance of being struck by flying wood chips, and also allows the operator to get in and cut under low hanging branches.

DETAILED DESCRIPTION OF THE FLIP-DOWN CHAINSAW CUTTER

Figure 1:
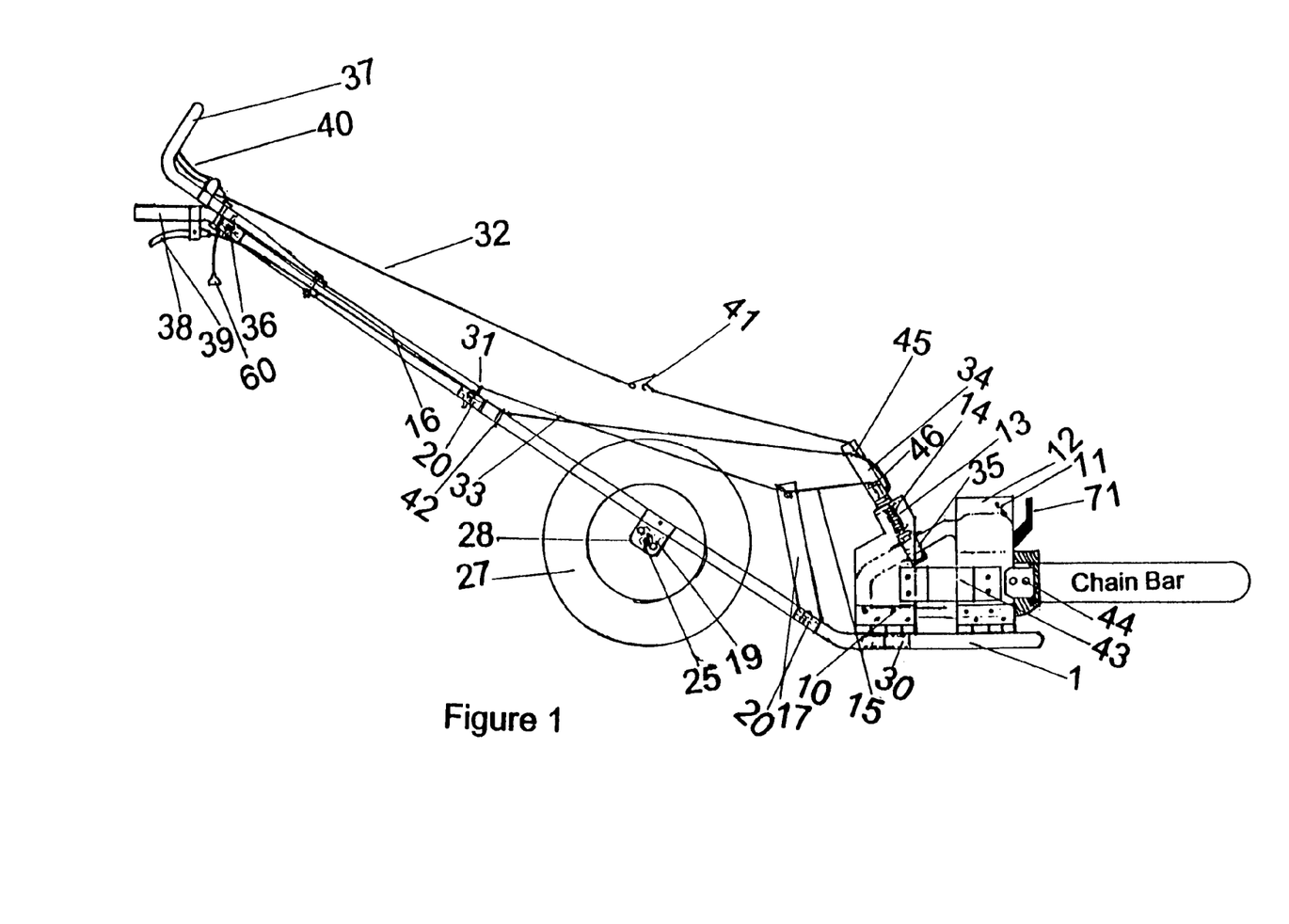
FIG. 1 shows an elevation view of the flip-down chainsaw cutter in the up (vertical) position along with the upper main frame and the throttle control levers.
Figures 2, 2A:
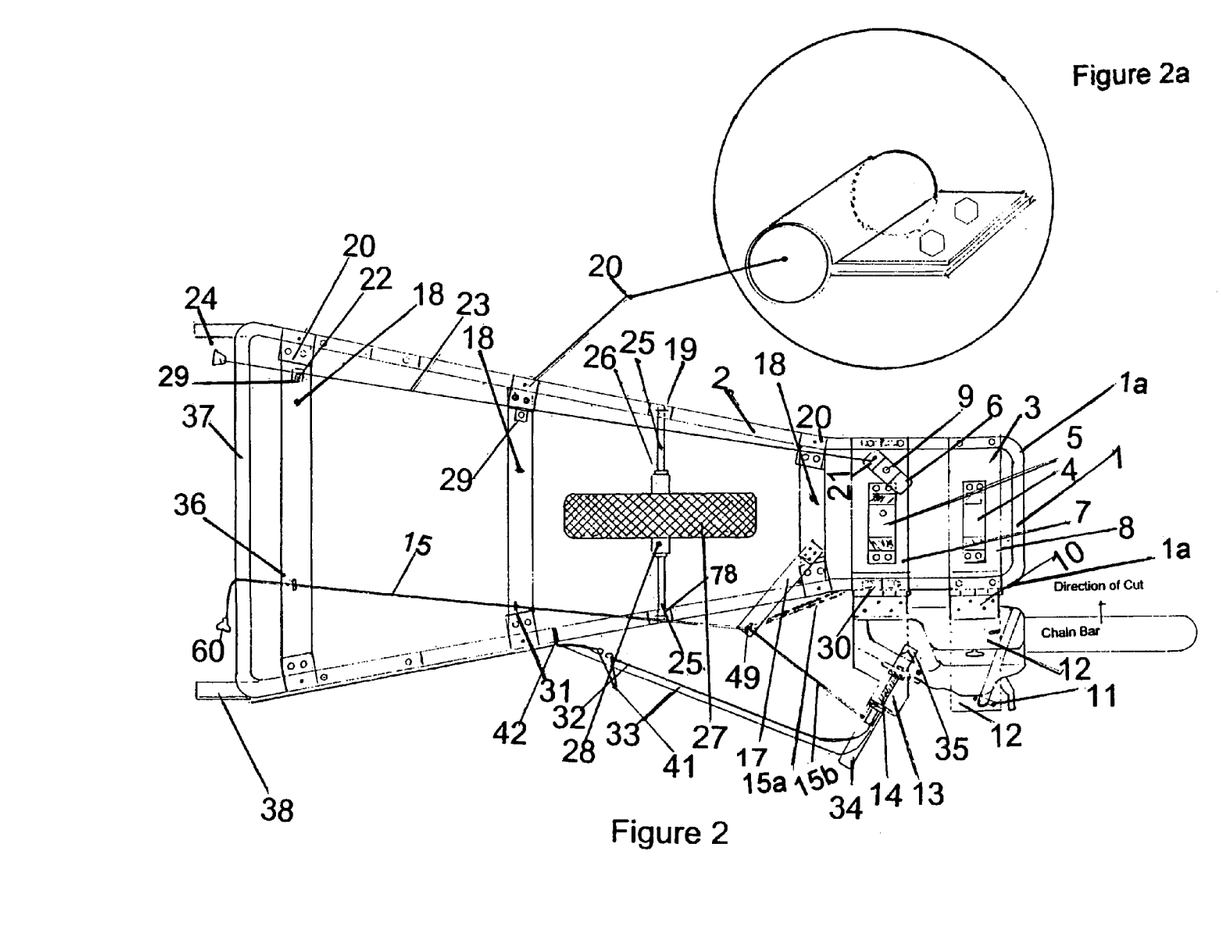
FIG. 2 shows an overhead view of the flip-down chainsaw cutter showing the saw in the down (horizontal) position, the pivot rose in the down position and in phantom in the upright position, and most of the structural parts.
FIG. 2*a* shows a magnified view of one of the frame spreader mounting brackets.
Figures 3, 3A:
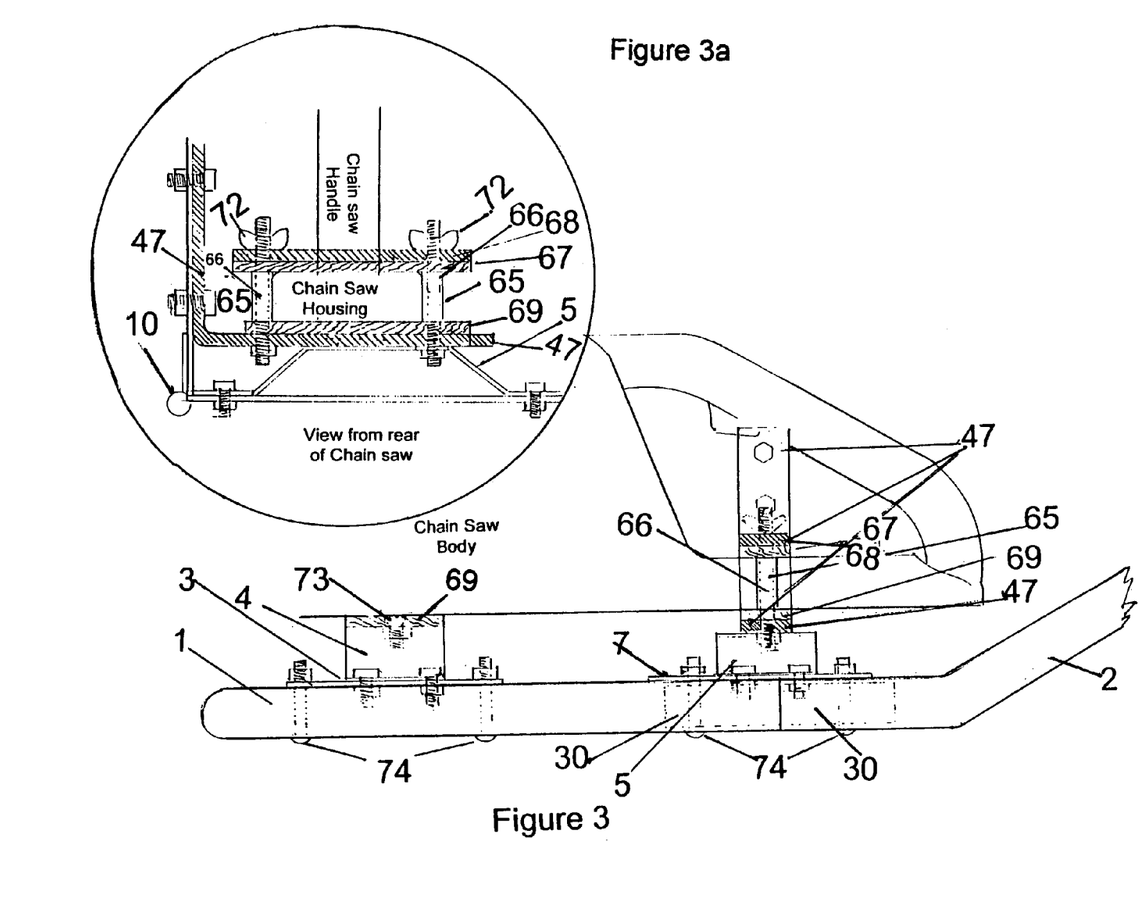
FIG. 3 shows an enlarged view of the structure for mounting the rear housing of the chain saw to the pivoting bracket plate.
FIG. 3*a* shows a rear view of the mounting structure for the chain saw.
Figures 4, 4A:
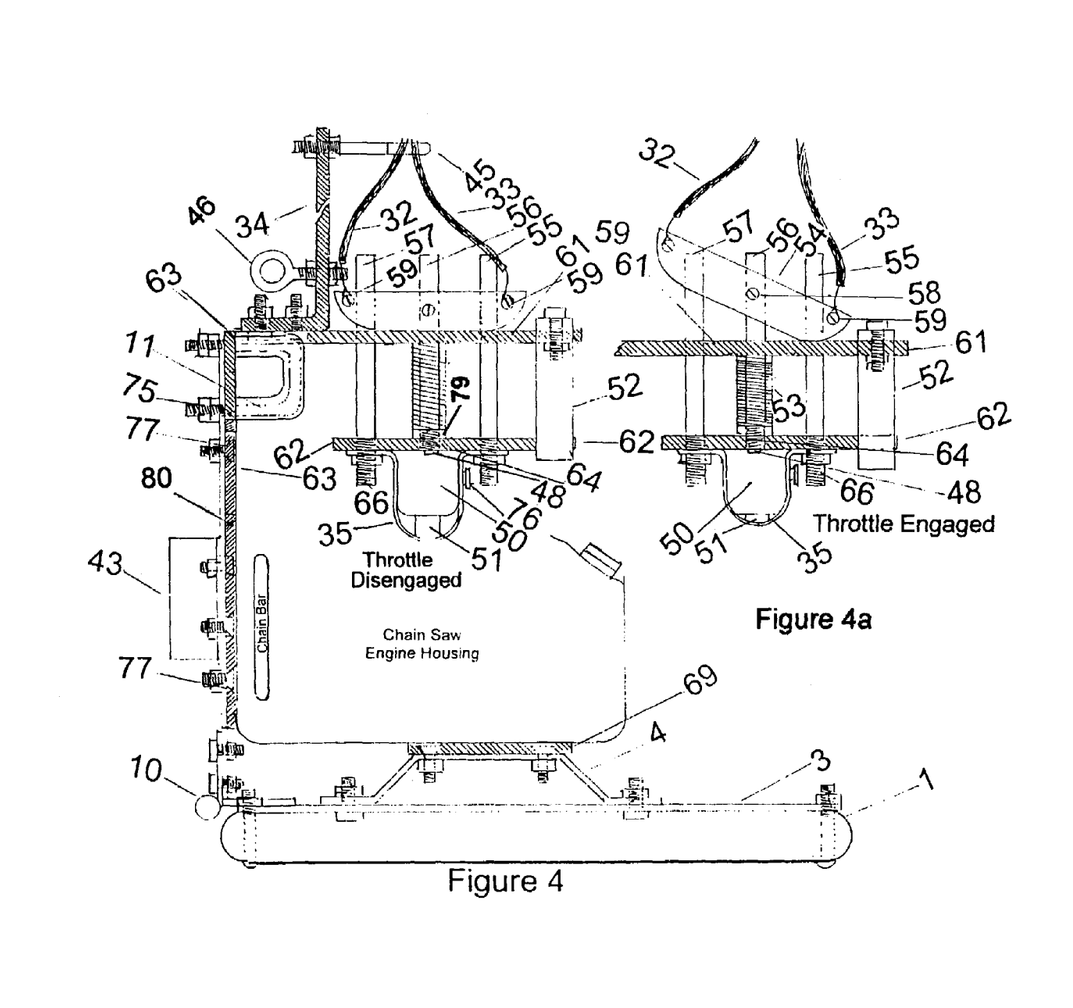
FIGS. 4 and 4*a* show sectional views of the main throttle unit in the disengaged and engaged positions, respectively, along with the cable attachment and depth gauge (stop).
Figure 5:
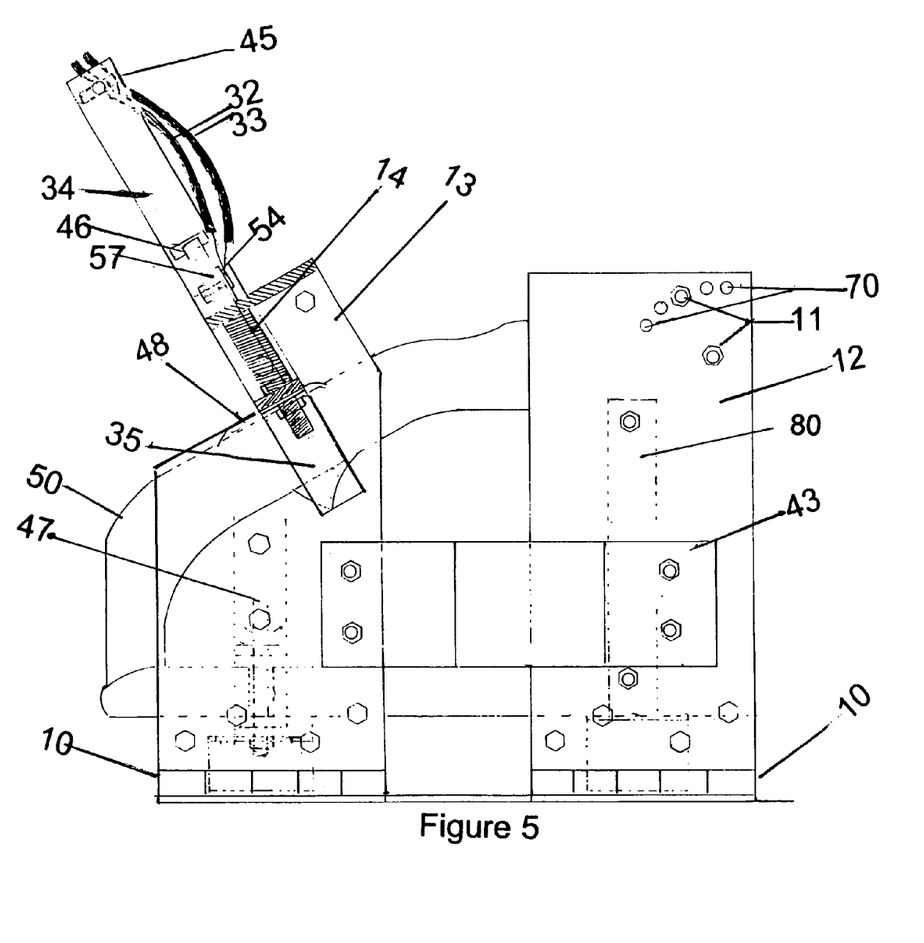
FIG. 5 shows the main throttle assembly in relationship to how it is mounted to the chainsaw handle, multiple holes for various mounting positions of the chainsaw to the front pivot plate, and the position of the throttle assembly to the chainsaw handle safety switch.
Figures 6, 6A:
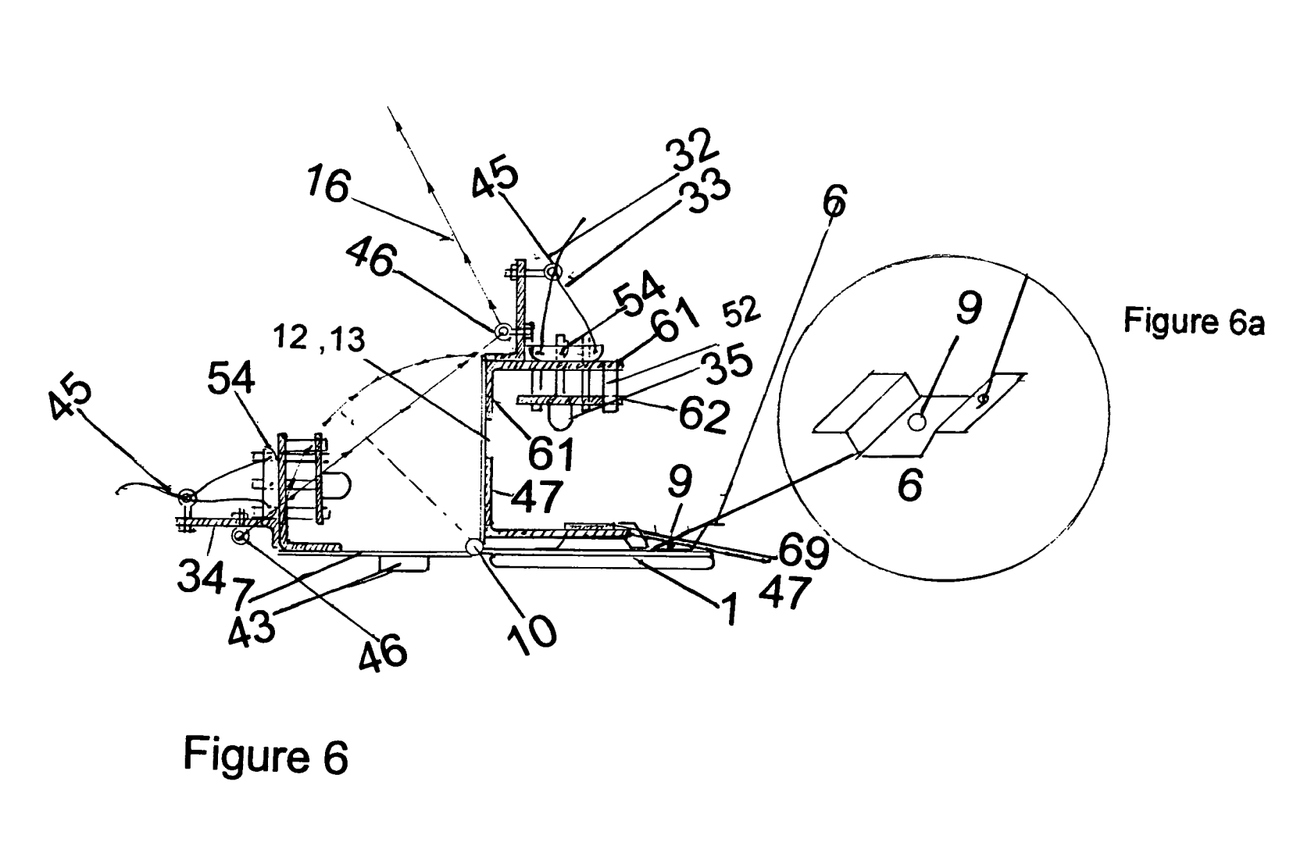
FIG. 6 shows the position of the main throttle control unit in the up (vertical) and the down (horizontal) position, the direction the pivot rope travels when lifting the saw to the up (vertical) position, and the up and down movement of the saw off the pivot hinge.
FIG. 6*a* shows a magnified view of the upright locking bracket.

The flip-down chainsaw cutter is shown in the horizontal cutting position (FIG. 2). The chainsaw is placed in the lower main frame (1) of the flip-down chainsaw cutter. The upper (2) and lower (1) main frame are constructed of metal tubing. The lower main frame (1) has two radii (1*a*) which form the front and also form the two sides which extend back to join the lower end of the upper main frame (2).

The upper and lower main frames are joined together by a metal spline (30). The upper main frame (2) has a bend at the lower end thereof that when joined with the lower main frame (2) by the spline (30) provides enough rise for a comfortable working height. The upper main frame (2) has two bends that provide two horizontally and rearwardly extending main frame handles (38).

The upper main frame (2) has two rearwardly extending members that are connected by three flat frame struts (spreaders) (18) and six frame spreader mounting brackets (20). The spreaders/struts (18) are sandwiched between two flat plates (shown in FIG. 2*a*) of the six frame spreader mounting brackets (20) and bolted together at the bottom, middle, and top positions on the upper main frame (2). When all the spreaders/struts (18) are secured to the two rearwardly extending members of the upper main frame (2), the upper main frame (2) becomes very rigid providing a solid frame on which the subsequent parts of the flip-down chainsaw cutter can be mounted.

A front platform plate (3) and a rear (or back) platform plate (7) are bolted to the front and rear of the lower frame (1), the front plate functioning as a starting step or a safety step. Front and rear (or back) pivoting mounting plates (12 and 13) are attached to the front and rear platform plates (3 and 7) by of two heavy hinges (10) which provide a very strong and positive pivot point for mounting the chain saw. A vibration and wear pad (80) for the chain saw housing is mounted on the front pivoting mounting plate 12.

Front and rear (or back) saw supports (4 and 5) are then bolted in the proper position and, with lower chainsaw pads (69) in place on the front and rear saw supports (4 and 5), give which gives the chain saw a solid rest when in the vertical position. An upright locking bracket (6) is then bolted in place with a pivot bolt (9).

The flip-down cutter depth gauge bracket/stop (43) is then bolted in place. This bracket keeps the chainsaw bar from coming in contact with the ground and also provides a solid rest for the chainsaw when cutting.

A main pivoted mounting bracket (47) is bolted to the rear pivoting mounting plate (13). This bracket rests on the rear saw support (5) when the saw is in the upright (vertical) position. The main pivoted mounting bracket (47) is threaded to receive the ends of two threaded studs (66). This provides a solid anchor point for the rear chainsaw body. The lower pad (69) for the chainsaw body corresponding to the rear saw support (5) is placed over both studs using holes provided in the pad (69). A rubber vibration/wear pad (65) is slid over each of the threaded studs (66) thus providing protection from wear on the chain saw body resulting from any vibration while the saw is in use.

The chainsaw is then mounted to the front pivoting mounting plate (12). The front end of the chain saw is secured to the front pivoting mounting plate (12) by a rubber coated U-bolt (11). The U-bolt (11) is threaded on both ends and passes around the front chainsaw handle. A rubber vibration pad (63) is sandwiched between the U-bolt and pivoting plate (12). The U-bolt (11) is then located in the appropriate mounting holes (70). The U-bolt (11) is then fastened using double nuts (75) to reduce the chance of coming loose during cutting operations.

The rear chainsaw housing is placed between the two threaded studs (66) used for mounting the rear body of the chain saw to the main pivoted mounting bracket (47) which is bolted to rear pivoting mounting plate (13). An upper pad (67) for the rear chainsaw housing is placed over the threaded mounting studs (66). A metal plate (68) is placed over the mounting studs (66) and rests on the upper pad (67). The plate (68) is secured to one of the threaded ends of each stud (66) by wing nuts (72). After the chainsaw is securely mounted to the pivoting mounting plates (12 and 13), it becomes part of the pivoting mounting plates (12 and 13) and will pivot with the plates (12 and 13). The flip-down cutter is made mobile by a wide wheel (27) and a solid steel axle (25). The wheel (27) includes a wheel hub (28) and is centered on the axle (25), and two axle locking collars (26) hold the axle centered. The axle (25) is secured to the main upper frame (2) by axle support brackets (19), and pins (78) are provided to lock the axle (25) to the axle brackets (19). The brackets (19) are positioned on the main upper frame (2) so as to let the wheel (27) rest on the same plane as the bottom of the main lower frame (1). This gives the flip-down cutter a solid pivot point when engaging the throttle while cutting in a horizontal position.

When the chainsaw is rotated to the vertical position and rests on both the front (4) and the rear support (5), the chainsaw can be locked in the vertical position with the upright locking bracket (6). This is accomplished by moving a steel locking rod (23) forward through guides (29) for the locking rod (23). These guides (29) are mounted on the flat frame struts/spreaders (18) by bolts (22). The locking rod (23) has an offset bend on the lower end that hooks in a hole (21) on the upright locking bracket (6). The locking rod (23) has a handle (24) on the upper end thereof to accomplish a push-pull motion needed to lock or unlock the locking bracket (6). The locking bracket (6) is constructed in a way that when in the locking position, it extends over the lower end of the main pivoted mounting bracket (47) which locks the saw in an upright (vertical) position. In order to pivot the chain saw to the horizontal position, the locking bracket (6) must be moved to the nonlocking position. This is done by pulling back on the locking rod handle (24) thus moving the locking bracket (6) to a neutral position with the chainsaw securely mounted to the pivot mounting plates (12 and 13).

A throttle assembly (14) can be attached to the chainsaw handle trigger (throttle). Several parts are used in the construction of the throttle assembly (14). The throttle assembly (14) is mounted to an upper throttle mounting control support plate (61) in a way that lets the chain saw operator control the throttle by throttle control cables (32 and 33).

The throttle assembly (14) consists of three steel rods (55, 56, and 57). These rods pass through three holes in the upper throttle control support plate (61). The two outside rods (55 and 57), which are throttle control guide and mounting studs, are threaded on one end and threaded through a lower throttle control plate (62) far enough to mount a throttle control stirrup (35). This stirrup (35) goes around the chainsaw trigger (throttle) in such a position as to make contact with the trigger. When the stirrup (35) is moved vertically, it engages the chainsaw trigger (throttle). When disengaged, the chainsaw trigger (throttle) returns to an idle position.

In order to accomplish this, the center steel rod (56) of the throttle assembly (14) is a center throttle control guide (56) which has a threaded end (64) that is threaded into the lower throttle control plate (62). This rod (56) passes through a throttle control spring (53), which is mounted between the upper throttle control plate (61) and a locking nut located on the threaded end (64), such that the throttle control spring (53) is mounted between the upper throttle control plate (61) and the lower throttle control plate (62). This throttle control spring (53) lets the throttle return to the neutral (idle or off) position when required.

The throttle assembly also has a U-shaped throttle guide bracket (52) which keeps the upper throttle mounting control support plate (61) and the lower throttle control plate (62) in proper alignment when the throttle is engaged.

To engage the throttle on the chainsaw, it is necessary to move the lower section of the throttle assembly (14) upward. This is accomplished by pivoting a throttle tension control bracket (54), which is pivotably mounted by a pivot bolt (58) to the center throttle control guide (56), relative to the center throttle control guide (56) in a way that when either end is raised, it engages the throttle on the chainsaw. This is accomplished by using the two throttle cables (32 and 33) that are each attached to a respective throttle control handle (39 and 40) and to the throttle tension control bracket (54). The cables are bolted to the throttle tension control bracket (54) with bolts (59). When one of the throttle control handles (39 and 40) is compressed, this causes the throttle tension control bracket (54) to lift thus engaging the throttle on the chainsaw. When the throttle control handles are released, the throttle tension control bracket (54) returns to a neutral position.

The throttle cables (32 and 33) pass through a throttle cable guide/eye bolt (45) which is mounted to a bracket (34) for mounting the throttle cable guide (45) and a pivot rope attaching eye bolt (46). The throttle cable (33) is for horizontal cutting and is secured to the upper main frame (2) by a throttle cable control frame strap (42) positioned in such a way that it provides enough tension on the cable (33) to engage the chainsaw trigger throttle. Throttle cable (33) is attached to the throttle control handle (39) on the right side of the upper main frame (2). Throttle cable (33) has sufficient length so that the chainsaw can pivot 90° when cutting horizontally. Throttle cable (33) is longer than throttle cable (32) and cannot be used when cutting in the vertical position. Therefore, throttle cable (32) must be used for vertical cutting. Throttle cable (32) is in two sections and must be connected by hooking upright throttle control connectors (41). This provides the correct tension on the throttle tension control bracket (54) for engaging the chainsaw throttle (trigger) while using the flip-down cutter in the vertical (upright) position. Throttle cable (32) is attached to handle (40) which is mounted on a transversely extending upper frame handle (37). Upper frame handle (37) is used to gain height for the chain bar when cutting in the vertical position without requiring the operator to bend too low.

The upper frame handle (37) is bolted to the upper main frame (2) which provides additional stability to the upper main frame (2). Upper frame handle (37) is further used when moving the flip-down cutter from one location to another as it gives the chain bar more height above the surface when pushed down to waist high position.

In order to use the flip-down cutter in both the vertical and horizontal positions, a way must be provided to enable the operator to change from the vertical position to horizontal and from horizontal to the vertical position. This important operation is accomplished by a pivot rope (15). The pivot rope (15) is secured to the eye bolt (46) located on the lower outside of the bracket (34). It then passes through a pivot guide (49) (eve bolt) which, is the main tension point, and is secured to a pivot tension bracket (17). This tension bracket (17), which is used to direct up and down torque pressure to pivot the saw, is bolted to the bottom flat frame strut (18).

The pivot tension bracket (17) is bent to an angle on the lower end that lets it extend to a height that is higher than the height of the pivot rope attaching eve bolt (46). The tension bracket (17) is bolted to the bottom flat frame strut (18) at an angle that lets the tension bracket (17) extend past the main upper frame (2), and the rope guide (49) (eye bolt) is bolted to the tension bracket (17). Two pivot rope guides (31 and 36) are bolted to the middle and upper flat frame struts (18). The pivot rope (15) passes from eve bolt 46, through all three pivot rope guides (49, 31 and 36) and terminates at a pivot rose handle (60). When the pivot tension rope (15) is attached to the eye bolt (46) and passes through guide (49), an angle is formed. This angle is great enough that when handle (60) is pulled, enough tension is created to lift the chainsaw from the horizontal position, wherein the pivot rose is in position 15b to vertical, wherein the pivot rope is in position 15a. By pulling the rope again, the saw will return to a horizontal position. It is easy for the operator to change cutting positions. While this is simple to perform, it is a very important part of the flip-down chainsaw cutter making it very safe and easy to use.

NOMENCLATURE

1. Lower main frame (tubular)
1a. Radius of lower main frame (1)
2. Upper main frame (tubular)
3. Front platform plate
4. Front saw support
5. Rear saw support
6. Upright locking bracket
7. Rear platform plate
8. Hinge side of front platform plate (3)
9. Pivot bolt for upright locking bracket (6)
10. Pivot hinge
11. U-bolt for use in mounting saw to front plate (12)
12. Front pivoting mounting plate
13. Rear pivoting mounting plate
14. Throttle assembly
15. Pivot rope
15a. Pivot rope in up (vertical) position
15b. Pivot rope in down (horizontal) position
17. Pivot tension bracket
18. Flat frame strut (spreader)
19. Axle support bracket
20. Frame spreader mounting bracket
21. Hole for mounting rod to locking bracket (6)
22. Bolt for mounting locking rod guide (29)
23. Locking rod
24. Locking rod handle
25. Axle
26. Axle locking collar
27. Wheel (tire)
28. Wheel hub
29. Guides for locking rod (23)
30. Spline for connecting lower frame (1) to upper frame (2)
31. Pivot rope guide
32. Throttle cable for use with saw in up (vertical) position
33. Throttle cable for use with saw in down (horizontal) position
34. Bracket for mounting throttle cable guide (45) and pivot rope attaching eve bolt (46)
35. Throttle control stirrup
36. Pivot rope guide
37. Upper frame handle (for gaining height when cutting vertically)
38. Main frame handle
39. Throttle control handle for use with saw in down (horizontal) position
40. Throttle control handle for use with saw for upright (vertical) position
41. Upright throttle control connector for cable (32, 33)
42. Throttle cable control frame strap
43. Depth gauge bracket (stop)
44. Chain bar adjusting bolt
45. Throttle cable guide (eye bolt)
46. Pivot rope attaching eye bolt
47. Main pivoted mounting bracket for mounting chain saw
48. Location for chain saw handle safety switch
49. Pivot rope guide (eve bolt)
50. Location for chain saw handle
51. Location for chain saw trigger (throttle)
52. U-shaped throttle guide bracket
53. Throttle control spring
54. Throttle tension control bracket
55. Throttle control guide and mounting stud for throttle stirrup (35)
56. Center throttle control guide
57. Throttle control guide and mounting stud for throttle stirrup (35)
58. Pivot bolt for throttle tension control bracket (54)
59. Cable mounting bolt
60. Pivot rope handle
61. Upper throttle mounting control support plate
62. Lower throttle control plate
63. Rubber vibration pad for U-bolt (11)
64. Threaded end of center throttle guide (56)
65. Rubber vibration/wear pad for threaded stud (66)
66. Threaded stud for mounting chain saw to main pivoted mounting bracket (47)
67. Upper pad for chain saw body
68. Metal plate for mounting chain saw to main pivoted mounting bracket (47)
69. Lower pad for chain saw body
70. Group of holes for mounting U-bolt (11) for various chain saws
71. Chain saw brake
72. Wing nuts for mounting rear of chain saw to main pivoted mounting bracket (47)
73. Counter sunk flat head machine screw (used so saw doesn't rest on head of screws)

74. Carriage bolts for mounting platform plates (3 and 7) to main frames (1 and 2) (carriage bolts provide a head that will not catch in the grass.)
75. Double nuts to prevent U-bolt (11) from coming loose due to vibration
76. Chain saw locking button for starting saw
77. Counter sunk flat head screws for mounting rubber vibration and wear pad (80)
78. Pin that locks the axle (25) to the axle bracket (19)
79. Locking nut on bottom of center throttle control guide (56)
80. Rubber vibration and wear pad for mounting between front pivoting mounting plate (12) and chain saw housing

The invention claimed is:

1. An apparatus for cutting down trees, comprising:
   a substantially longitudinally extending main frame including a lower main frame portion at a front thereof and an upper main frame portion at a rear thereof;
   a wheel attached to said main frame for supporting and moving the apparatus during cutting operations and during transporting of the apparatus;
   at least one frame handle rigidly disposed at a rear end of the upper main frame portion;
   at least one platform plate mounted on the lower main frame portion and extending substantially horizontally, each said platform plate having a saw support mounted thereon;
   a main pivoted mounting bracket pivotably mounted to the at least one platform plate, said main pivoted mounting bracket configured to mount a saw thereon, wherein said main pivoted mounting bracket is pivotable from a vertical sawing position to a horizontal sawing position, and wherein said main pivoted mounting bracket is aligned with one of said saw supports for abutment therewith in the vertical sawing position;
   an upright locking bracket pivotably mounted to said lower main frame portion, and a locking rod connected to said upright locking bracket and extending to a rear end of the main frame proximate said frame handle for pivoting said upright locking bracket between locking and nonlocking positions, said upright locking bracket being positioned such that when said main pivoted mounting bracket is in said vertical sawing position, said upright locking bracket can be pivoted to lock said main pivoted mounting bracket in said vertical sawing position;
   a saw pivoting control device for pivoting the main pivoted mounting bracket between said vertical and horizontal sawing positions, said saw pivoting control device connected to said main pivoted mounting bracket and extending to said rear end of said main frame proximate said frame handle for remotely controlling the sawing position of said saw; and
   a throttle control device for controlling the throttle of the saw, said throttle control device connected to said main pivoted mounting bracket for cooperation with said saw, said throttle control device extending to said rear end of said main frame proximate said frame handle for remotely controlling the throttle of the saw;
   wherein the saw is mountable to the apparatus at a front end thereof and can be pivoted and operated by an operator from a rear end thereof.

2. The apparatus for cutting down trees of claim 1, wherein said saw pivoting control device includes a pivot rope connected at one end to the main pivoted mounting bracket and at the other end connected to a pivot rope handle positioned proximate said frame handle.

3. The apparatus for cutting down trees of claim 1, wherein said saw pivoting control device is connected to said main pivoted mounting bracket by at least one pivoting mounting plate, each pivoting mounting plate connected to a respective one of the at least one platform plate.

4. The apparatus for cutting down trees of claim 1, wherein said throttle control device includes a throttle cable connected at one end to a throttle control handle, the throttle control handle positioned proximate said frame handle, and said throttle cable connected at its other end to throttle control structure for controlling the throttle of the saw.

* * * * *